UNITED STATES PATENT OFFICE.

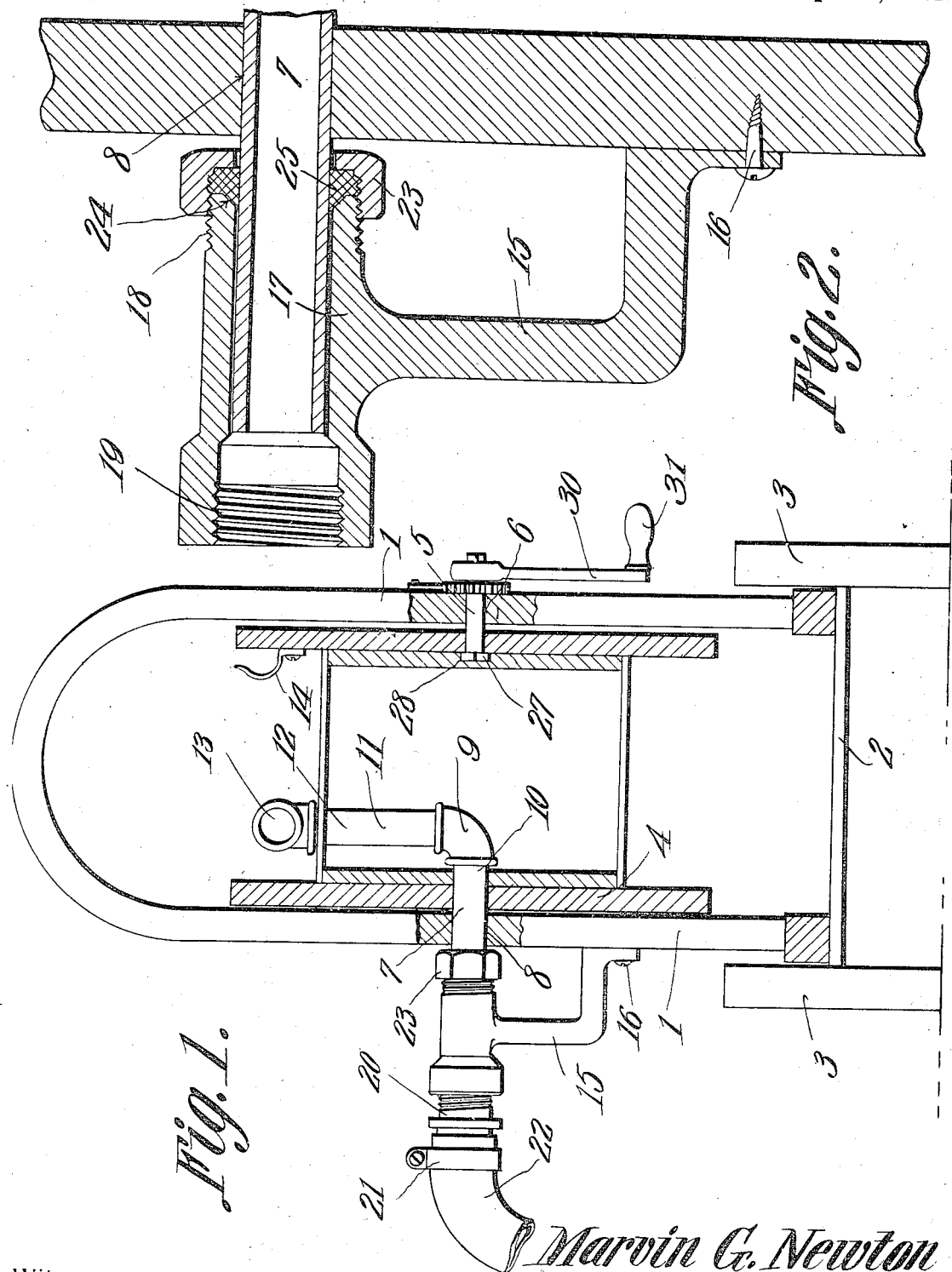

MARVIN G. NEWTON, OF AUSTIN, TEXAS, ASSIGNOR OF ONE-HALF TO NATHANIEL M. NEWTON, OF AUSTIN, TEXAS.

GARDEN-HOSE REEL.

990,453.   Specification of Letters Patent.   Patented Apr. 25, 1911.

Application filed August 31, 1910. Serial No. 579,871.

*To all whom it may concern:*

Be it known that I, MARVIN G. NEWTON, a citizen of the United States, residing at Austin, in the county of Travis and State of Texas, have invented a new and useful Garden-Hose Reel, of which the following is a specification.

It is the object of the present invention to provide an improved reel for garden hose, the same being so constructed that the hose may be used whether completely or only partly unwound from the reel and it is the primary aim of the invention to so construct the reel that it may readily be taken apart for the purpose of repair.

Other features and combination of parts will be hereinafter set forth, shown in the drawings, and pointed out in the appended claim.

In the drawings: Figure 1 is a view in elevation of the hose reel, showing parts of the structure in section. Fig. 2 is a detail sectional view of the bracket for supporting a hose connection between the reel and the water supply pipe.

Referring to the drawings, 1 designates a suitable frame work, which is provided with a pair of axles 2, upon the ends of which the wheels 3 are journaled, in order to render the device portable.

4 represents a revolving reel, one head of which has a stub shaft 5, which is mounted in a bearing 6 in the frame of the device. The other side of the reel has an axial pipe 7, which is mounted in a bearing 8 in the frame. This pipe 7 has an elbow 9 threaded to it as at 10. Threaded to the elbow 9 is a pipe 11, to the end 12 of which an elbow 13 is connected. To this elbow 13 the usual garden hose (not shown) is adapted to be connected. After the garden hose is connected to the elbow, the same is wound about the reel, and the nozzle thereof may be supported in the clip 14 of the reel. By supporting the nozzle in this manner, one may dispose the reel upon the grass in the desired manner, and turn on the water to sprinkle the grass.

15 represents a bracket, secured at 16 to the side of the frame 1. This bracket is formed at its upper end with a sleeve 17, the exterior of which at one end is provided with threads 18. The other end of the sleeve is interiorly threaded at 19. Engaging the threads 19 is the hose coupling member 20, to which a short hose (there being only a portion thereof shown) may be connected by means of the usual form of clamp 21. This short hose 22 is designed to be connected with the water supply pipe in any suitable manner. Screwed onto the exteriorly threaded end of the sleeve 17 is a gland nut 23, through which and into the sleeve the pipe 7 extends. The pipe 7 fits loosely in the nut 23 and the sleeve 17, in order that the same may readily rotate when the reel is revolved. The end of the sleeve 17 is provided with a beveled wall 24, against which packing 25 is arranged and by screwing the gland nut 23 up tight the packing 25 is securely clamped in place, and snugly against the circumference of the pipe 7.

It will be clearly seen that one may entirely unwind the hose, or partly so, just as desired. The stub shaft 5 is formed with a rectangular head 27, which is seated in a recess 28, in order to cause the reel to rotate with the stub shaft 5 when the crank 30 and the handle 31 are manipulated.

From the foregoing, it will be clearly noted that a novel and efficient device of this nature is produced, and by which one may easily and readily water lawns and gardens and the like.

The invention having been set forth, what is claimed as new and useful is:

In a hose reel, a frame including spaced members formed with alined openings, a bracket comprising an arm, secured upon one of the frame members and projecting upwardly beside the same, a sleeve at the upper end of the arm axially alined with the opening in the frame member upon which the arm is secured and spaced at its inner end from the said frame member, the sleeve at its outer end being interiorly threaded for the connection of a supply hose, a gland nut threaded upon the inner end of the sleeve, a packing gland held between said nut and the said end of the sleeve, a pipe fitted rotatably in the sleeve and in the opening in the frame member opposite which the sleeve is positioned, a reel rotatably supported at one end upon the pipe, a stub shaft at the other end of the reel fitting in the opening in the other member of the frame, a pipe fitting through the body of the reel, an elbow connecting the two said pipes, and an elbow at the end of the last mentioned pipe for the connection therewith of a hose wound upon the reel.

In testimony that I claim the foregoing as my own, I have hereto affixed my signature in the presence of two witnesses.

MARVIN G. NEWTON.

Witnesses:
CHAS. T. CLARK,
J. S. HARGRAVE.